Dec. 19, 1933.   R. STRESAU   1,940,277
PRESSURE VESSEL
Filed Aug. 18, 1930

INVENTOR.
Richard Stresau
BY
ATTORNEY.

Patented Dec. 19, 1933

1,940,277

UNITED STATES PATENT OFFICE 1,940,277

PRESSURE VESSEL

Richard Stresau, Wauwatosa, Wis., assignor to A. O. Smith Corporation, Milwaukee, Wis., a corporation of New York Application August 18, 1930. Serial No. 476,045

4 Claims. (Cl. 196—133)

The present invention relates to pressure vessels.

Another object of the invention is to provide a pressure vessel having an outer wall and a liner of corrosion resisting metal capable of independent expansion and contraction therein.

A more specific object of the invention is to provide a pressure vessel having an outer wall and a corrosion resisting metal liner, and having said wall and liner insulated from each other so that the temperature of the outer wall will be maintained at a relatively lower temperature than that of the liner.

The invention will be best understood by referring to the accompanying drawing in which.

In using various types of pressure and vacuum vessels, the charge is heated before entering the vessel. It is desirable to retain the heat in the charge, hence heat insulation is often applied to the outside of the vessel.

In cracking oils, especially those bearing sulfur, it is also desirable to provide some protection for the inner wall of the vessel because of the tendency of the wall to corrode under the attack of the highly corrosive fluids contained in the vessel, at the high temperatures at which the charge is maintained. This protection is afforded preferably in the form of a relatively thin liner of corrosion resisting metal, such as a chromium alloy.

A further difficulty in providing a vessel capable of withstanding these extreme operating conditions is that of providing an outer wall having sufficient strength to withstand high pressures of 400–1,000 pounds per square inch at high temperatures of 800° to 900° F. The greater the temperature, the thicker must be the metal wall to withstand the pressure.

A vessel embodying features adapted to perform efficiently under these conditions has been designed by the applicant. In carrying out the invention, a vessel 1 is provided, preferably having relatively thick steel walls for withstanding the internal pressures required in use.

The vessel is preferably fabricated from a number of flat plates which are rolled into cylindrical form and welded on their longitudinal seams by means of an electric arc. The cylinders are then aligned end to end and welded on their circumferential meeting edges to form a huge integral cylinder. Thereafter heads are welded in place to close the ends of the cylinder.

In carrying out the present invention only one of the heads may be welded to the cylinder prior to applying the liner thereto.

Figure 2:
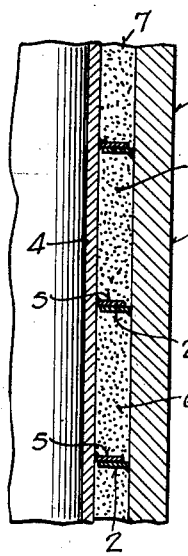
Fig. 2 is a longitudinal section of a portion of a pressure vessel made in accordance with a preferred embodiment of the invention.

In the preferred form shown in Fig. 2, a number of baffles 2 are then welded or otherwise secured to the vessel wall 3. Each baffle 2 is disposed at substantially right angles to the wall 3 of the vessel and forms an endless hoop about the inside of the vessel. The baffles 2 may be spaced apart according to the conditions under which they operate.

The liner 4 of corrosion resisting metal is provided with baffles 5 similar to those on the vessel wall 3. The liner 4 is installed in sections which are then welded together to provide a continuous liner. The baffles 5 of the liner fit snugly against the baffles 2 of the vessel wall 3. Before completing the installation of each section by welding the seam, dry sand 6, asbestos, or other heat insulating material is placed in the space 7 between the vessel wall 3 and the liner 4. The remainder of the liner 4 is installed in the same manner, the remaining head is welded in place and the vessel is completed. Other means of filling the space 7 between the wall 3 and liner 4 may be used, such as blowing the insulating material 6 in under air pressure through holes in the liner 4 or wall 3 and thereafter sealing the holes by welding.

When the vessel is placed in operation the baffles 2 and 5 keep the sand 6 from shifting out of place and leaving the liner 4 partly without support or insulation. When the hot charge of crude oil or other matter is introduced into the vessel, the liner 4 becomes heated by conduction to a high temperature. The sand 6 or other insulating material prevents the escape of heat into the outer wall. Hence the expansion of the liner 4 is relatively greater than that of the vessel wall 3. This expansion is anticipated in the construction of the liner 4, and the liner is made small enough so that at working temperature the baffles 5 engage the vessel wall 3, and the baffles 2 engage the liner 4. Since the greater part of the heat is retained, the vessel operates more efficiently.

A further advantage of this construction is that the vessel wall 3 is maintained at a relatively low temperature and hence is possessed of greater strength and provides a vessel about which the operators can work with an assurance of safety. This also allows employment of more severe operating conditions such as higher working pressures and temperatures for a given thickness of vessel wall.

Figure 1:
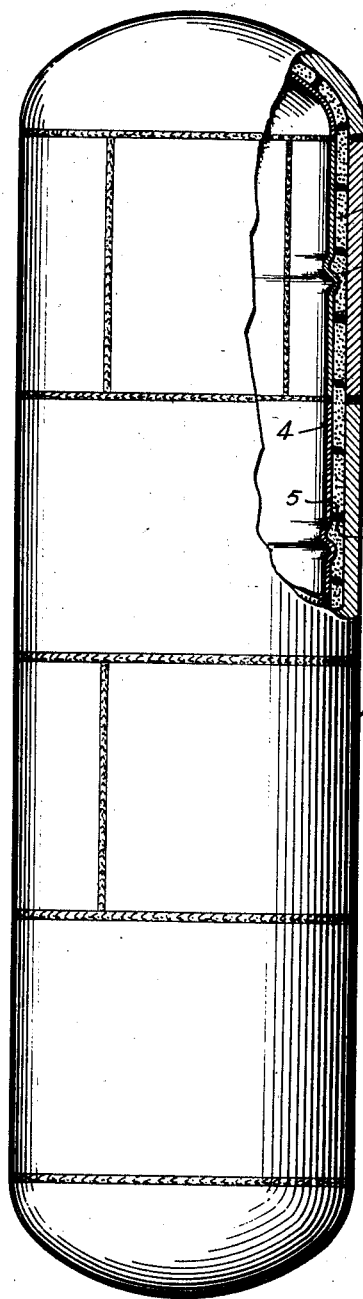
Figure 1 is a side view of a pressure vessel embodying the present invention, with a part of the vessel cut away.

The liner 4 may have circumferential corrugations therein as shown in Fig. 1, for the purpose of taking care of excessive expansion of the liner and allow for the connection of manways thereto.

The provision for independent contraction and expansion of the liner 4 and vessel wall 3 reduces the likelihood of warping and injuring the liner because of characteristics of unequal expansion due to unequal heating and inherently different coefficients of expansion of unlike metals.

Figure 3:
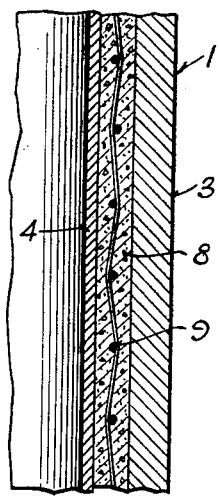
Fig. 3 is a similar view of a modified embodiment of the invention.

The modified form shown in Fig. 3 employs concrete 8 or cement reenforced with screen 9 to insulate the vessel wall 3 from the heat of the liner 4.

Figure 4:
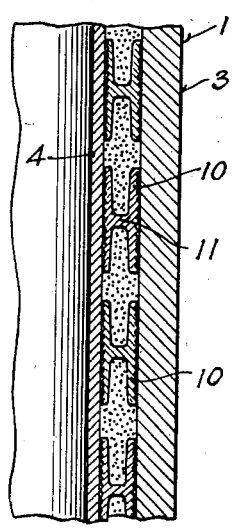
Fig. 4 is a lonigtudinal sectional view of a portion of a pressure vessel showing another modified form of construction.

Another modification is illustrated in Fig. 4 in which bands 10 or hoops having an H-shape cross section are used to retain the sand 6 in place. The connecting web 11 of the band 10 is a poor conductor of heat, and a vessel constructed in the manner shown operates in the same efficient way as in the preferred form.

It will be understood that I claim all embodiments of the invention within the spirit and scope of the appended claims.

I claim:

1. In a pressure vessel for oil cracking a relatively thick metal vessel wall, a metallic liner, baffles projecting at right angles to the vessel, baffles projecting at right angles to the liner, said wall and liner baffles being in sliding engagement with each other, and heat insulating material disposed between the liner and the vessel wall and retained in relatively the same position between the wall and liner by the baffles.

2. In a pressure vessel for cracking crude oils, in combination, a thick metal outer wall capable of resisting high fluid pressures, a relatively thin liner of corrosion resisting metal for protecting the outer wall, circumferential baffles attached to the liner, and corresponding baffles attached to the vessel wall adapted to cooperate and divide the space between the liner and wall into compartments and to permit relative movement of the liner and wall, and insulating material in the compartments for maintaining the outer wall at a relatively low temperature.

3. In a pressure vessel for crude oil cracking, in combination, a relatively thick outer wall for resisting high fluid pressures, a liner of corrosion resisting metal, baffle plates disposed in the space between the outer wall and liner to form a plurality of compartments, the baffles being alternately joined to the wall of the vessel and to the liner to permit relative movement of the wall and liner, the liner baffles being supported by the outer wall baffles, and insulating material in each of the compartments for preventing overheating of the outer wall.

4. In a pressure vessel for cracking crude oils, in combination, a thick metal outer wall capable of withstanding high fluid pressures, a liner of relatively thin corrosion resistant metal for protecting the outer wall, corrugated expansion elements in the liner to permit independent expansion and contraction of the liner with respect to the outer wall, means interposed between the outer wall and the liner for supporting the latter, the supporting means permitting free relative movement, and insulating material between the outer wall and liner for maintaining the outer wall at a relatively low temperature.

RICHARD STRESAU.